(12) United States Patent
Gould et al.

(10) Patent No.: US 7,346,700 B2
(45) Date of Patent: Mar. 18, 2008

(54) SYSTEM AND METHOD FOR MANAGING E-MAIL MESSAGE TRAFFIC

(75) Inventors: Kenneth Gould, Oakton, VA (US); John Anthony Chen, Ashburn, VA (US)

(73) Assignee: Time Warner Cable, a division of Time Warner Entertainment Company, L.P., Stamford, CT (US)

( * ) Notice: Subject to any disclaimer, the term of this patent is extended or adjusted under 35 U.S.C. 154(b) by 882 days.

(21) Appl. No.: 10/408,273

(22) Filed: Apr. 7, 2003

(65) Prior Publication Data

US 2004/0199592 A1 Oct. 7, 2004

(51) Int. Cl.
*G06F 15/16* (2006.01)
*G06F 15/173* (2006.01)

(52) U.S. Cl. .................. 709/232; 709/235; 709/225

(58) Field of Classification Search ............ 709/225, 709/224, 232, 235; 726/22–26
See application file for complete search history.

(56) References Cited

U.S. PATENT DOCUMENTS

| | | | |
|---|---|---|---|
| 6,507,866 B1 * | 1/2003 | Barchi ................ | 709/207 |
| 7,032,031 B2 * | 4/2006 | Jungck et al. ......... | 709/246 |
| 7,047,303 B2 * | 5/2006 | Lingafelt et al. ...... | 709/229 |
| 2002/0118699 A1 * | 8/2002 | McKinnon et al. ..... | 370/447 |
| 2003/0149726 A1 * | 8/2003 | Spear ................. | 709/206 |
| 2003/0229714 A1 * | 12/2003 | Kiremidjian et al. .... | 709/244 |
| 2004/0010712 A1 * | 1/2004 | Hui et al. ............ | 713/201 |
| 2004/0199635 A1 * | 10/2004 | Ta et al. ............. | 709/226 |
| 2004/0215977 A1 * | 10/2004 | Goodman et al. ...... | 713/201 |
| 2005/0111489 A1 * | 5/2005 | Krishnan ............. | 370/468 |
| 2005/0128951 A1 * | 6/2005 | Chawla et al. ........ | 370/235 |

* cited by examiner

*Primary Examiner*—Paul H. Kang
(74) *Attorney, Agent, or Firm*—Roberts, Mardula & Wertheim, LLC

(57) ABSTRACT

A system and method for managing e-mail traffic originating from a specific IP address. An outbound e-mail message is routed to an e-mail governor where the IP address of the computer from which outbound e-mail message originated is determined. A record associated with the originating IP address is created in a datastore. Metrics useful to determine an e-mail message rate and an e-mail byte rate are stored in the e-mail record. An e-mail message rate is determined and compared with an e-mail message rate threshold. If the e-mail message rate threshold is exceeded, the originating IP address is sending spam e-mail (spam) and redial action is taken. An e-mail byte rate is also determined and compared with an e-mail byte rate threshold. If the e-mail byte rate threshold is exceeded, the originating IP address is using excess network resources to send e-mail and redial action is taken.

38 Claims, 6 Drawing Sheets

SYSTEM AND METHOD FOR MANAGING E-MAIL MESSAGE TRAFFIC

FIELD OF INVENTION

The present invention relates in general to electronic mail. More specifically, the present invention provides system and method for managing e-mail traffic originating from a specific IP address.

BACKGROUND OF THE INVENTION

According to a study undertaken for the European Commission, Internet subscribers world-wide are unwittingly paying an estimated euro 10 billion a year in connection costs just to receive "junk" e-mails (also referred to as spam). Typically, a person who sends spam (the "spammer") will do so via a dial-up or a broadband Internet Service Provider (ISP). The spammer sends e-mail message from an e-mail client and uses the ISP's e-mail server to deliver the e-mail message to the recipients or to other e-mail servers that will eventually forward the e-mail message to the intended recipient.

Today, there are few good solutions for preventing the transmission of spam. Typically, a spammer is stopped when the spammer's ISP receives a certain number of complaints about the spammer's activities, at which point the ISP may elect to deny the spammer access to the ISP's e-mail server (assuming that the ISP is able to determine which customer is the spammer). If the ISP from which the spam is originated does not, or cannot, take action against the spammer, other ISPs or network providers will simply "blacklist" all e-mail messages from the spammer's ISP, which means that the other ISPs or network providers will refuse to accept or forward any e-mail messages coming from the spammer's ISP. This has unfortunate consequences for other customers of the spammer's ISP as their legitimate e-mail messages will also be rejected from the other ISPs or network providers. Thus, while Internet subscribers pay the cost and inconvenience of receiving spam, ISPs that receive spam and pass it on to the Internet face more their own set of consequences.

Not only must ISPs deal with the consequence of spam, but so must a growing number of shared Internet access providers (SIAPs). A SIAP may be a stand-alone service provider or, more commonly, a brick-and-mortar establishment (for example, a coffee house, a pub, or a café) that offers access to the Internet as an additional service, either through wired terminals or through a wireless network.

Wireless connectivity has recently become popular with SIAPs, especially those SIAPs that are also food establishments. A customer (a user) provides a laptop computer that either has a wireless 802.11x transmitter/receiver attached or built into the laptop. The SIAP provides a wireless 802.11x access point that shares an Internet connection with multiple users.

One problem with shared systems is that such systems can be used to send large volumes of unsolicited e-mail through the SIAP's ISP. The SIAP's ISP, in order to protect itself and its other customers from being blacklisted by other ISPs, may in turn block all e-mail message traffic from the SIAP.

There are several means by which a spammer can send e-mail message from an SIAP: (1) the spammer uses the SIAP's e-mail server; (2) the spammer uses the SIAP's network to transmit e-mail messages directly to another ISP's e-mail server (presumably the spammer is a customer of that other ISP and is actually paying for the other ISP's services); or (3) the spammer hosts an e-mail server on the spammer's laptop and transmits e-mail messages onto the Internet from the SIAP's network.

In the case of (2) above, the SIAP is not in jeopardy of being blacklisted as the other ISP's e-mail server is the source of the e-mail messages about which other ISPs will complain. However, the spammer may be affecting other customers of the SIAP if the spammer is consuming an excessive amount of bandwidth of the SIAP's shared network. In both (1) and (3), the SIAP is put in jeopardy of being blacklisted by other providers as it would appear as though all of the spam is originating from within the SIAP's network.

What ISPs, SIAPs, and other Internet access providers (collectively, IAPs) have in common is that e-mail abusers are a problem that may have serious consequences for the IAP and its customers.

What is needed is a system and method for determining whether e-mail messages originating from an IP address are spam and, if identified as spam, for limiting e-mail traffic originating from that IP address. Such a system and method should also provide means to determine if a particular IP address is using excess network resources to send e-mail over a network.

SUMMARY OF THE INVENTION

An embodiment of the present invention is a system for differentiating between legitimate e-mail and spam and for managing the bandwidth available for e-mail messaging to a particular IP address assigned by an IAP. In one embodiment, an e-mail governor is deployed by an IAP to monitor and regulate the number of e-mail messages originating from an IP address over a time interval. In another embodiment of the present invention, an e-mail governor is utilized by an IAP to monitor and regulate the bandwidth used for e-mail messaging from an IP address over a time interval.

It is therefore an aspect of the present invention to monitor e-mail message traffic originating from a specific IP address assigned by an IAP.

It is yet another aspect of the present invention to measure the rate at which e-mail messages originate from a specific IP address assigned by an IAP.

It is still another aspect of the present invention to take remedial action when the rate of e-mail traffic originating from a specific IP address assigned by an IAP exceeds a pre-determined limit (an email message rate threshold).

It is another aspect of the present invention to measure the bandwidth used over a time interval to originate e-mail messages from a particular IP address assigned by an IAP.

It is still another aspect of the present invention to take remedial action if the bandwidth consumption rate exceeds a predetermined limit.

These and other aspects of the present invention will become apparent from a review of the general and detailed descriptions that follow. The present invention provides a system and method for differentiating between customers who "use" e-mail and those who "abuse" e-mail in a shared network environment by measuring the number of e-mail messages sent per unit of time (the "e-mail message rate"). In an embodiment of the present invention, an e-mail governor measures the number of e-mail messages sent per unit of time and takes remedial action if the e-mail message rate exceeds an email message rate threshold indicative of spamming activity. In another embodiment, the e-mail governor measures bandwidth used for e-mail messaging from an IP address over a time interval (the "e-mail byte rate"). In one embodiment, the e-mail governor is a device. In an alternative embodiment, the e-mail governor is a software application.

In an embodiment of the present invention, an IAP network comprises an e-mail server. A router is used to redirect all network traffic destined to the well-defined e-mail message relay port of the e-mail server to the e-mail governor. For every e-mail message that is seen by the e-mail governor, the source IP address associated with that e-mail message is tracked by the e-mail governor. The e-mail governor keeps statistics for each originating IP address that transmits the mail message and the number of e-mail messages transmitted from the originating IP address over a time interval. As each e-mail message is received, the e-mail governor calculates the rate at which e-mail messages are being transmitted by the originating IP address (the e-mail message rate). If the e-mail message rate does not exceed an email message rate threshold, the e-mail governor sends the e-mail message over the IAP's network toward its destination.

If the e-mail message rate exceeds an email message rate threshold, remedial action is taken. In one embodiment of the present invention, the e-mail message is discarded or rejected and the appropriate notification is made to the IAP's administrator indicating that abuse is occurring. In another embodiment of the present invention, if the e-mail governor rejects an e-mail message (but does not discard it), the e-mail governor generates an appropriately formatted e-mail message response to the e-mail message sender indicating that e-mail messages are being rejected.

The email message rate threshold is established by the IAP such that message rate threshold is high enough not to be exceeded by any legitimate user, yet low enough to remove the incentive for a spammer to attempt to use the resources of the IAP for spamming.

In another embodiment, the e-mail governor monitors the cumulative bytes of e-mail messages sent over a time interval from an IP address on a shared network (the e-mail byte rate). As each e-mail message is received, the e-mail governor calculates the e-mail byte rate. If the e-mail byte rate does not exceed an e-mail byte rate threshold, the e-mail governor sends the e-mail message over the IAP's network toward its destination. If the e-mail byte rate exceeds an e-mail byte rate threshold, remedial action is taken.

In still another embodiment of the present invention, the e-mail governor monitors the e-mail message traffic originating from all of the IP addresses assigned by an IAP. If a combined e-mail message rate exceeds a combined e-mail message rate threshold, or if a combined e-mail byte rate exceeds a combined e-mail byte rate threshold, the e-mail governor sorts the IP addresses from which e-mail messages are originating by e-mail byte rate and determines if one or more IP addresses are utilizing excessive network resources relative to other IP addresses. If excess network resource consumption by a particular IP address is detected, remedial action is taken. In an embodiment of the present invention, remedial action comprises refusing, delaying or discarding e-mail from that IP address. In an alternate embodiment, outbound e-mail messages from the particular originating IP address are placed in a message queue for delayed delivery. If the number of messages in the message queue associated with the originating IP address exceeds a queue threshold value, remedial action is taken. In an embodiment of the present invention, remedial action comprises refusing, delaying or discarding e-mail from that IP address.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

An embodiment of the present invention is a system for differentiating between legitimate e-mail and spam and for managing the bandwidth available to a particular IP address assigned by an Internet access provider (IAP). In one embodiment, an e-mail governor is deployed by an IAP to monitor and regulate the number of e-mail messages originating from an IP address.

Figure 1:
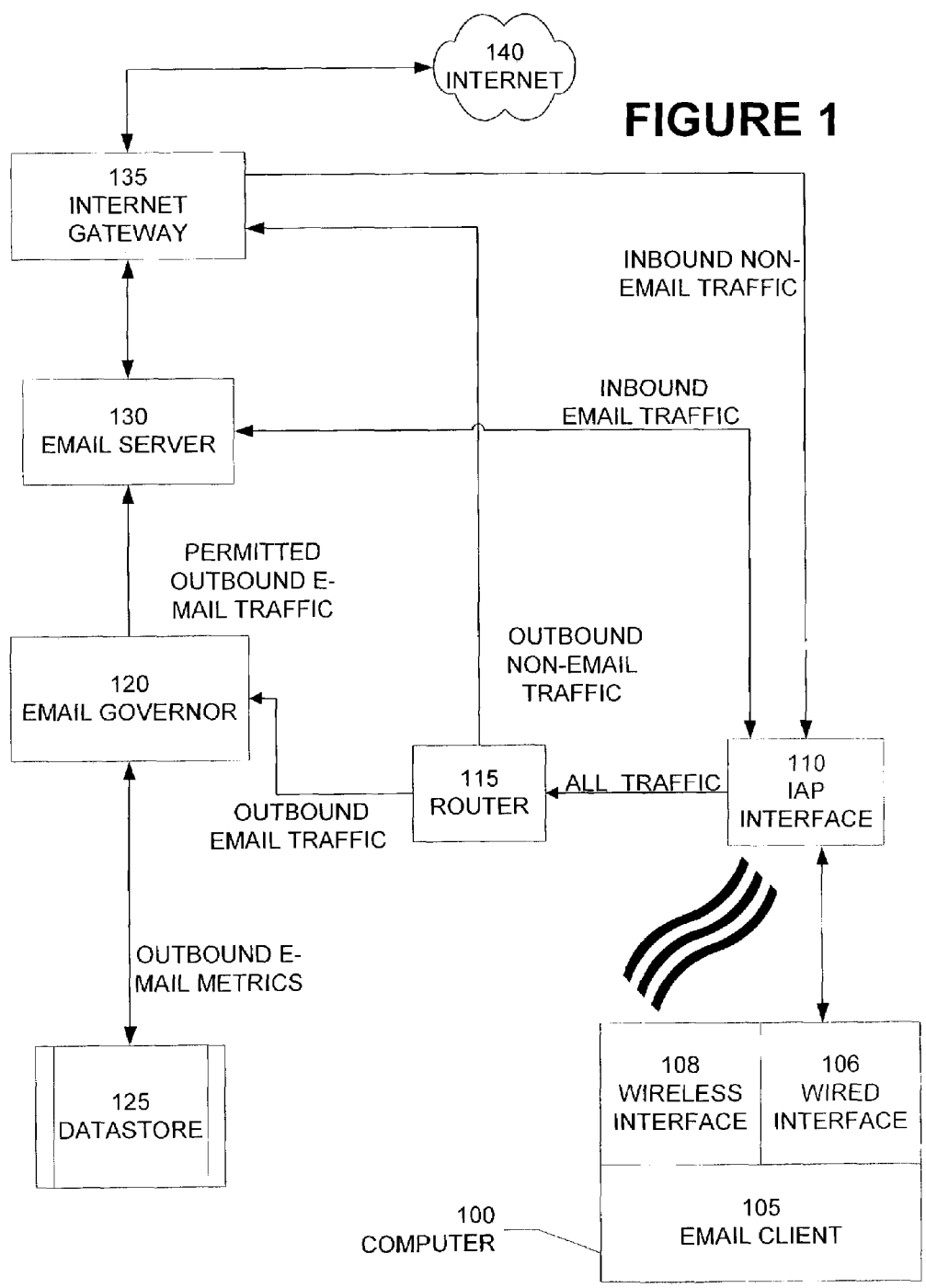
FIG. 1 illustrates an e-mail governor in an IAP network comprising an e-mail server according to an embodiment of the present invention.

Referring to FIG. 1, a computer 100 comprising an e-mail client 105 is connected to IAP interface 110 through a wired interface 106. As illustrated, computer 100 may also connect to IAP interface 110 through wireless interface 108. The connection between computer 100 and ISP interface 110 can be accomplished through means well known in the art. For example, the connection through wired interface 106 may be made over the public switched network, over a wideband cable system, or over a DSL connection. The connection over wireless interface 108 may be made through an 802.11x-compliant transmitter/receiver attached or built into computer 100, or using wireless devices complaint with other wireless communication standards such as BlueTooth. As will be apparent to those skilled in the art, any means for connecting the computer 100 and IAP interface 110 may be used without departing from the scope of the present invention.

All outbound traffic (traffic from the computer toward the IAP) is directed from the IAP interface 110 to router 115. Router 115 identifies outbound e-mail messages through means well known in the art and directs outbound e-mail messages to e-mail governor 120. Outbound traffic other than outbound e-mail messages are directed to the Internet gateway 135. The e-mail governor 120 parses the outbound e-mail message and obtains from the IP packet header the IP address of the computer from which the outbound e-mail message originated.

Datastore 125 receives the origination IP address and other e-mail metrics. As will be described below, the IP address and the e-mail metrics are used to compute an e-mail message rate and/or an e-mail byte rate for the origination IP address. The e-mail message rate is used to determine if whether e-mail sent from the origination IP address is spam. The e-mail byte rate is used to determine if the origination IP address is using excess network resources to send e-mail.

Outbound e-mail messages that are determined by the e-mail governor 120 not to be "spam" are sent to e-mail server 130 and onto the Internet 140 through Internet gateway 135.

Figure 2:
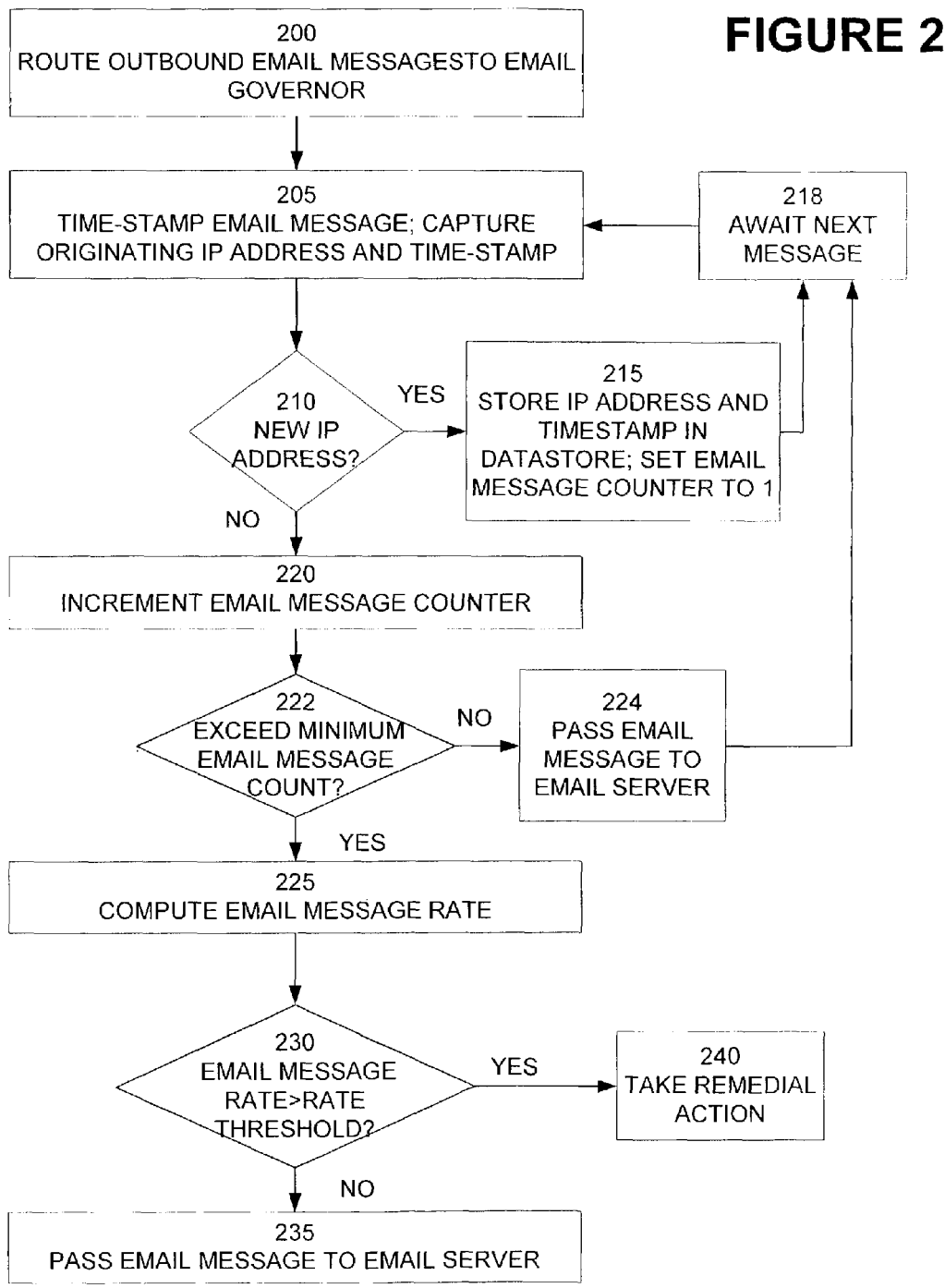
FIG. 2 illustrates a process according to an embodiment of the present invention by which an IP address is determined to be sending spam.

FIG. 2 illustrates a process according to an embodiment of the present invention by which outbound e-mail messages are determined to be spam or to be legitimate e-mail messages. The outbound e-mail message is routed to the e-mail governor 200. The e-mail message is time-stamped and the time-stamp and the IP address of the computer from which the e-mail message originated (the originating IP address) are determined using methods well know in the art 205. The e-mail governor checks the datastore to determine if the originating IP address is new 210. If the originating IP address is new, an IP address record is created in the datastore and the time-stamp of the e-mail message is stored in the IP address record, and an e-mail message counter is set to one 215. The e-mail governor waits for the next e-mail 218.

If the originating IP address is not new, the e-mail message counter with the datastore is incremented 220. A determination 222 is made if a minimum number of e-mail messages have been sent from the originating IP address. This determination helps avoid mistakenly identifying of an e-mail message as spam. A small number of e-mail messages sent over a short period of time might result in a high e-mail message rate that is not indicative of the actual e-mail traffic originating from an IP address. If the minimum number of e-mail messages sent for an originating IP address is not exceeded, then the last e-mail outbound e-mail message is forwarded to the e-mail server for handling 224 and e-mail governor waits the next e-mail message 218.

If the minimum number of e-mail message sent is exceed for an originating IP address 222, the e-mail governor determines an e-mail message rate 225 for the originating IP address based on the time-stamp data of the e-mail message represented by e-mail message count 1 (the first e-mail message). The time represented by the time stamp of the first message is subtracted from the time represented by the timestamp of the newly arrived message (e-mail message "n") to compute the time period over which the "nth" message arrived. The e-mail message rate is determined by dividing "n" by the computed time period.

The e-mail governor determines whether the e-mail message rate exceeds an email message rate threshold 230. If the e-mail message rate does not exceed the email message rate threshold, the outbound e-mail message is forwarded to the e-mail server for handling 235. If the e-mail message rate exceeds the email message rate threshold, remedial action is taken 240. In one embodiment of the present invention, the remedial action is to discard the outbound e-mail message and to block all future e-mails from the originating IP address. In another embodiment, the remedial action is to send a warning to the originating IP address before blocking the e-mail messages from the originating IP address.

In still another embodiment, e-mail messages originating from the originating IP address will be forwarded to an e-mail server queue for transmission on a delayed basis so as to allocate the bandwidth available to all of the subscribers of the e-mail operator. In yet another embodiment, if the number of e-mail messages in the e-mail server queue from a particular originating IP address exceeds a queue threshold value, the e-mail messages are discarded. As will be apparent to those skilled in the art, other remedial actions may be taken in the event that the e-mail rate exceeds the email message rate threshold without departing from the scope of the present invention.

In still another embodiment of the present invention, an IP address record is deleted based on a set of management criteria. In one embodiment, the IP address record is deleted when the right of a particular computer to use the originating IP address is terminated. Alternatively, the IP address record is deleted when the right to use an originating IP address is reassigned or regranted. In yet another embodiment, the IP address record is deleted upon expiration of a set time period after its creation. As will be apparent to those skilled in the art, other criteria may be applied to the management of IP address records without departing from the scope of the present invention.

Figure 3:
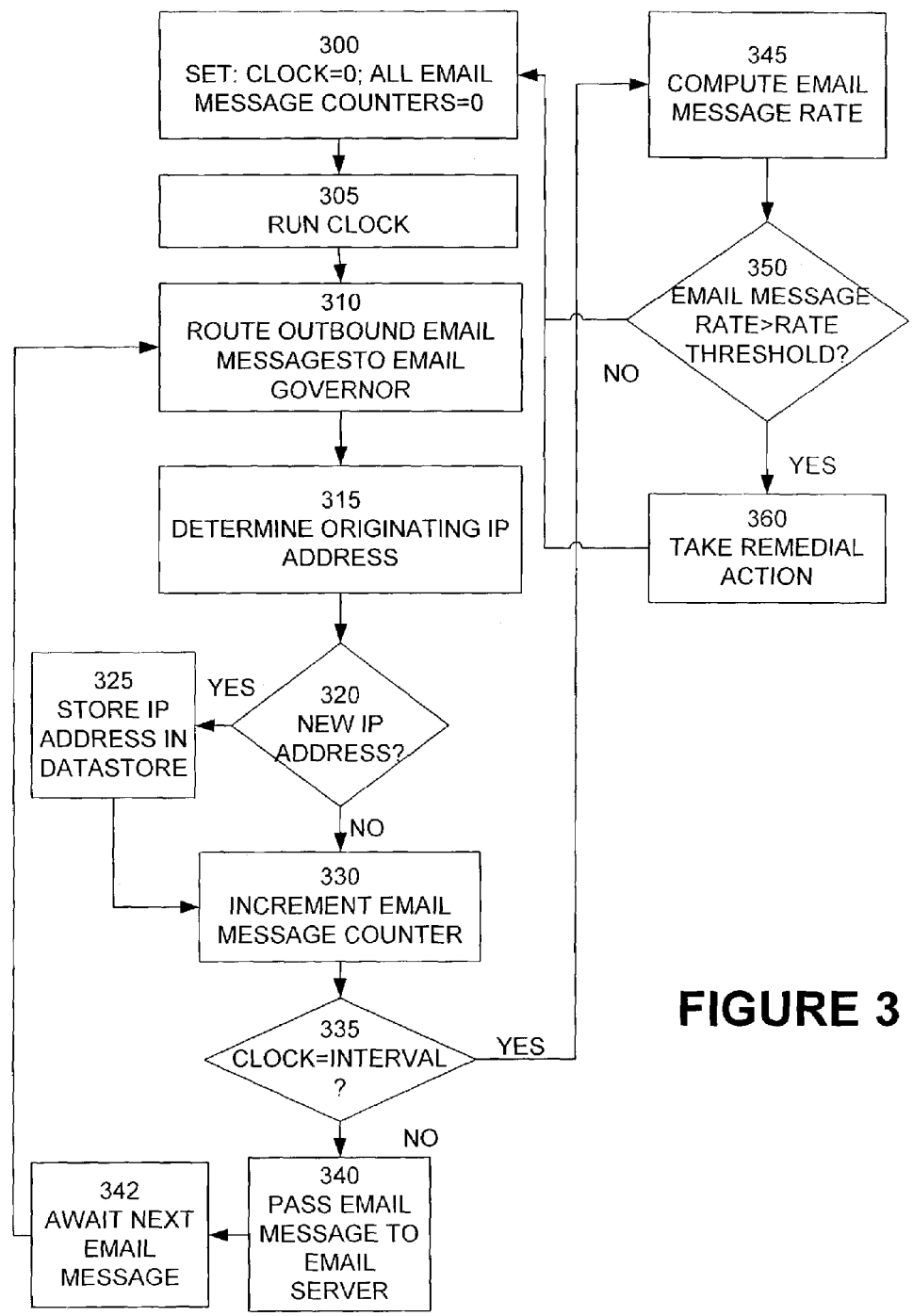
FIG. 3 illustrates another process according to an embodiment of the present invention by which an IP address is determined to be sending spam.

In another embodiment of the present invention, the e-mail message rate is computed using a clock that runs for an interval and then is reset. E-mail messages are counted during the interval and the e-mail message rate (e-mail messages per interval) is the e-mail message count. Referring to FIG. 3, a clock and all e-mail message counters are set to zero 300. The clock is started 305 and e-mail messages are routed to the e-mail governor 310. The e-mail governor determines the originating IP address of the e-mail message 315 and if the originating IP is new 320. If the originating IP address is new, the e-mail governor creates an originating IP address record for the originating IP address within a datastore 325. The e-mail message counter for the originating IP address is incremented 330 and a check is made to determine if the clock interval has been reached 335. If the clock interval has not been reached, the e-mail message is forwarded to the e-mail server for handling 340 and the e-mail governor waits the next e-mail message 342. If the clock interval has been reached, then e-mail message rate is computed 345 for each originating IP addresses stored in the datastore. The e-mail message rate for each IP address stored in the datastore is compared to the e-mail message rate threshold 350. For those originating IP address for which the e-mail message rate exceeds the email message rate threshold, remedial action is taken 360. In one embodiment of the present invention, the remedial action is to discard the outbound e-mail message and to block all future e-mails from the originating IP address. In another embodiment, the remedial action is to send a warning to the originating IP address before blocking the e-mail messages from the originating IP address. In still another embodiment, e-mail messages originating from the originating IP address will be forwarded to an e-mail server queue for transmission on a delayed basis so as to allocate the bandwidth available to all of the subscribers of the e-mail operator. In yet another embodiment, if the number of e-mail messages in the e-mail server queue from a particular originating IP address exceeds a threshold value, the e-mail messages are discarded. As will be apparent to those skilled in the art, other remedial actions may be taken in the event that the e-mail rate exceeds the email message rate threshold without departing from the scope of the present invention. Whether or not the e-mail message rate threshold has been exceeded, the clock and all e-mail message counters are reset to zero and the process begins again.

In another embodiment of the present invention, the e-mail message count is accumulated over a number of intervals and a second e-mail message rate is determined over the multiple intervals. The second e-mail message rate is measured against a second e-mail message rate threshold to determine if remedial action should be taken. In this way, the IAP can define spam in terms of both a short time interval and a long time interval.

In another embodiment, an IAP uses the e-mail governor to monitor the bandwidth usage of e-mail message traffic originating from an IP addresses assigned by the IAP.

Figure 4:
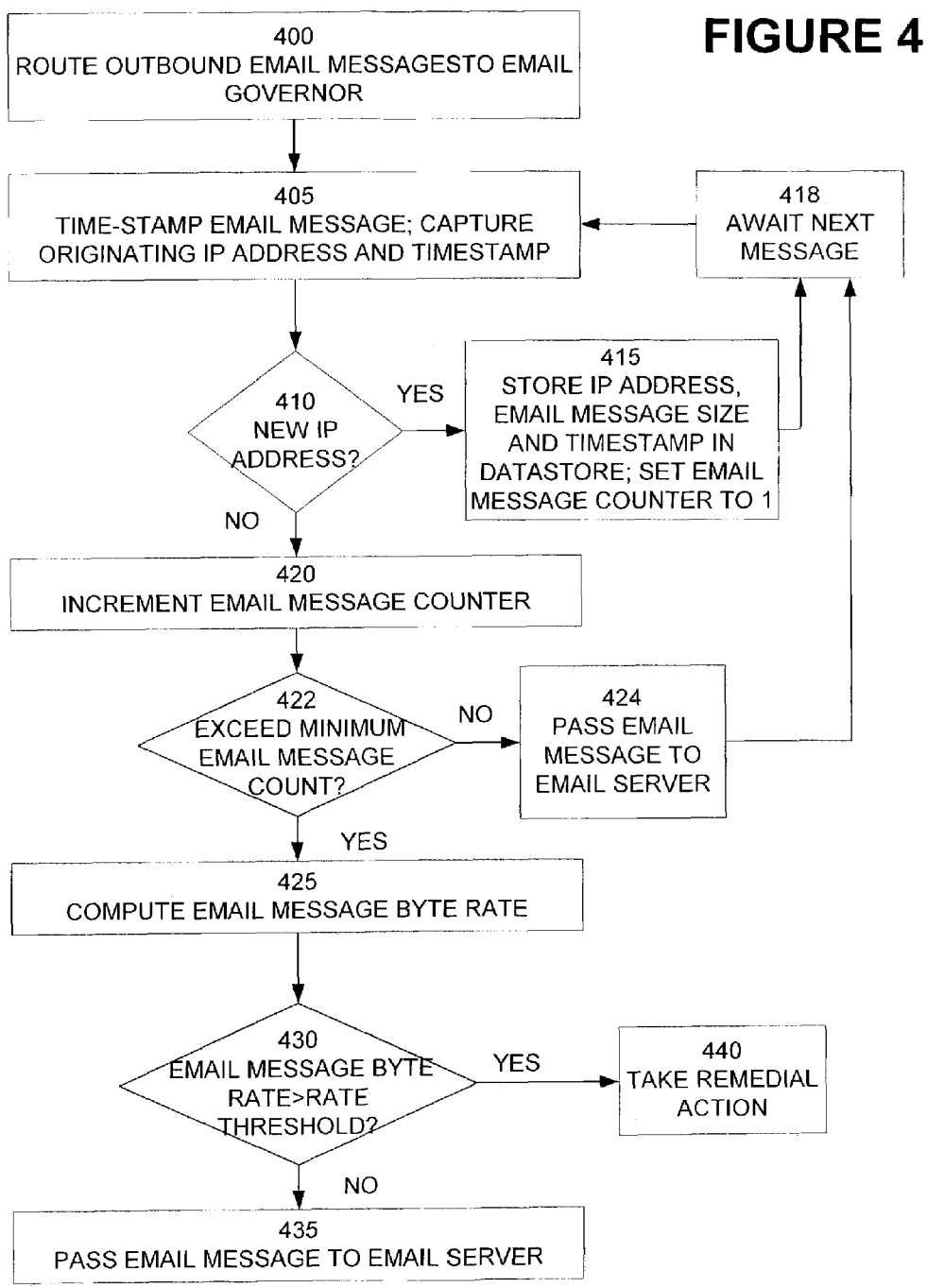
FIG. 4 illustrates a process according to an embodiment of the present invention by which an IP address is determined to be using excess network resources.

Referring to FIG. 1, the e-mail governor 120 sends e-mail metrics to datastore 125 useful in determining whether an outbound e-mail byte rate exceeds an e-mail byte rate threshold. FIG. 4 illustrates a process according to an embodiment of the present invention by which an outbound e-mail byte rate is calculated and compared to an e-mail byte rate threshold.

The outbound e-mail message is routed to the e-mail governor 400. The e-mail message is time-stamped and the time-stamp and the IP address of the computer from which the e-mail message originated (the originating IP address) are determined using methods well know in the art 405. The e-mail governor checks the datastore to determine if the originating IP address is new 410. If the originating IP address is new, an IP address record is created in the datastore, the time-stamp of the e-mail message and the size of the e-mail message in bytes is stored in a bytes register within the IP address record, and an e-mail message counter is set to one 415. The e-mail governor then waits for the next e-mail 418.

If the originating IP address is not new, the e-mail message counter with the datastore is incremented and the size of the e-mail message in bytes is added to the bytes register in the IP address record 420. A determination is made if a minimum number of e-mail messages have been sent from the originating IP address 422. This determination helps avoid mistakenly identifying of an e-mail message as spam. A small number of e-mail messages sent over a short period of time might result in a high e-mail byte rate that is not indicative of the actual e-mail traffic originating from an IP address. If the minimum number of e-mail messages sent for an originating IP address is not exceeded, then the size of the e-mail message is forwarded to the e-mail server for handling 424 and e-mail governor waits for the next e-mail message 418.

If the minimum number of e-mail message sent is exceeded for an originating IP address, the e-mail governor determines an e-mail byte rate 425 for the originating IP address based on the time-stamp data of the e-mail message represented by e-mail message count 1 (the first e-mail message). The time represented by the time stamp of the first message is subtracted from the time represented by the timestamp of the newly arrived message (e-mail message "n") to compute the time period over which the "nth" e-mail message arrived. The size of the nth e-mail message in bytes is added to the bytes register within the IP address record. The e-mail byte rate is determined by dividing the value in the bytes register by the computed time period.

The e-mail governor determines whether the e-mail byte rate exceeds an e-mail byte rate threshold 430. If the e-mail byte rate does not exceed the e-mail byte rate threshold, the outbound e-mail message is forwarded to the e-mail server for handling 435. If the e-mail byte rate exceeds the e-mail byte rate threshold, remedial action is taken 440.

In one embodiment of the present invention, the remedial action is to discard the outbound e-mail message and to block all future e-mails from the originating IP address. In another embodiment, the remedial action is to send a warning to the originating IP address before blocking the e-mail messages from the originating IP address. In still another embodiment, e-mail messages originating from the originating IP address will be forwarded to an e-mail server queue for transmission on a delayed basis so as to allocate the bandwidth available to all of the subscribers of the e-mail operator. In yet another embodiment, if the number of e-mail messages in the e-mail server queue from a particular originating IP address exceeds a queue threshold value, the e-mail messages are discarded. As will be apparent to those skilled in the art, other remedial actions may be taken in the event that the e-mail rate exceeds the email message rate threshold without departing from the scope of the present invention.

In another embodiment of the present invention, the e-mail byte rate is computed using a clock that runs for an interval and then is reset. E-mail message size in bytes is cumulated in during the interval and the e-mail byte rate (bytes per interval) is the value in the bytes register within the originating IP address record.

Figure 5:
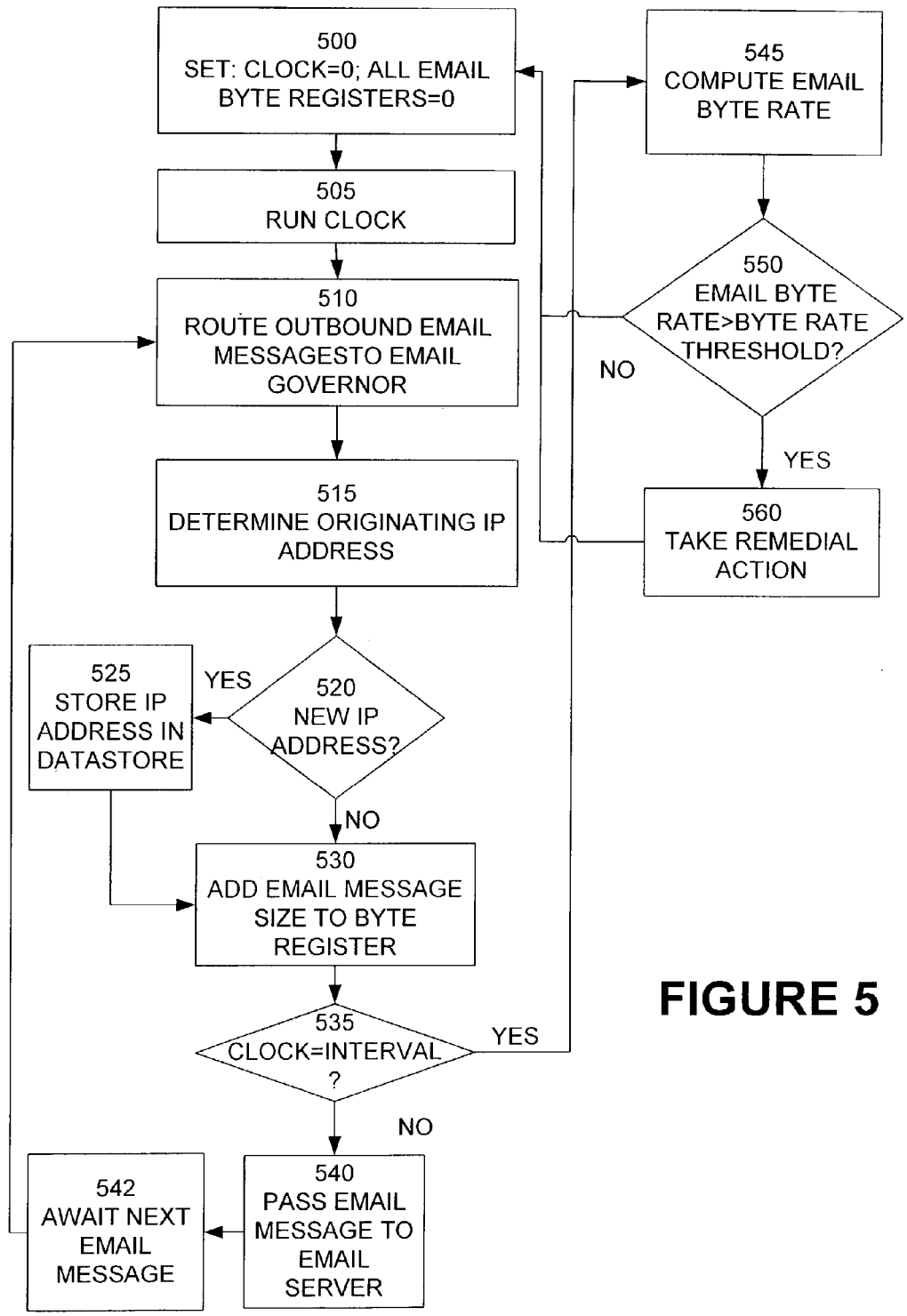
FIG. 5 illustrates a process according to an embodiment of the present invention by which an IP address is determined to be using excess network resources.

Referring to FIG. 5, a clock and all e-mail message byte registers are set to zero 500. The clock is started 505 and e-mail messages are routed to the e-mail governor 510. The e-mail governor determines the originating IP address of the e-mail message 515 and if the originating IP is new 520. If the originating IP address is new, the e-mail governor creates an originating IP address record for the originating IP address within a datastore 525. The size of the e-mail message in bytes is added to the byte register within the originating IP address record 530, and a check is made to determine if the clock interval has been reached 535. If the clock interval has not been reached, the e-mail message is forwarded to the e-mail server for handling 540 and the e-mail governor awaits the next e-mail message 542. If the clock interval has been reached, then e-mail byte rate for the interval is computed for all originating IP addresses stored in the datastore. The e-mail byte rate for the interval equals the value in the bytes register within the originating IP address record.

For those originating IP address for which the e-mail byte rate exceeds the e-mail byte rate threshold, remedial action is taken 580. In one embodiment of the present invention, the remedial action is to discard the outbound e-mail message and to block all future e-mails from the originating IP address. In another embodiment, the remedial action is to send a warning to the originating IP address before blocking the e-mail messages from the originating IP address. In still another embodiment, e-mail messages originating from the originating IP address will be forwarded to an e-mail server queue for transmission on a delayed basis so as to allocate the bandwidth available to all of the subscribers of the e-mail operator. In yet another embodiment, if the number of e-mail messages in the e-mail server queue from a particular originating IP address exceeds a queue threshold value, the e-mail messages are discarded. As will be apparent to those skilled in the art, other remedial actions may be taken in the event that the e-mail byte rate exceeds the e-mail byte rate threshold without departing from the scope of the present invention. Whether or not the e-mail byte rate threshold has been exceeded, the clock and all e-mail message byte registers are reset to zero and the process begins again.

In another embodiment of the present invention, the e-mail message byte count is accumulated over a number of intervals and a second e-mail byte rate is determined over the multiple intervals. The second e-mail byte rate is measured against a second e-mail byte rate threshold to determine if remedial action should be taken. In this way, the IAP can define resource usage in terms of both a short time interval and a long time interval.

In still another embodiment of the present invention, the e-mail governor monitors the e-mail message traffic of all users connected to the IAP's network. If the combined e-mail message rate exceeds a combined e-mail message rate threshold, or if the combined e-mail byte rate exceeds a combined e-mail byte rate threshold, the e-mail governor sorts the IP addresses from which e-mail messages are originating by e-mail byte rate and determines if one or more users are utilizing excessive bandwidth relative to other users. If excess bandwidth consumption by an IP address is detected, remedial action is taken.

Figure 6:
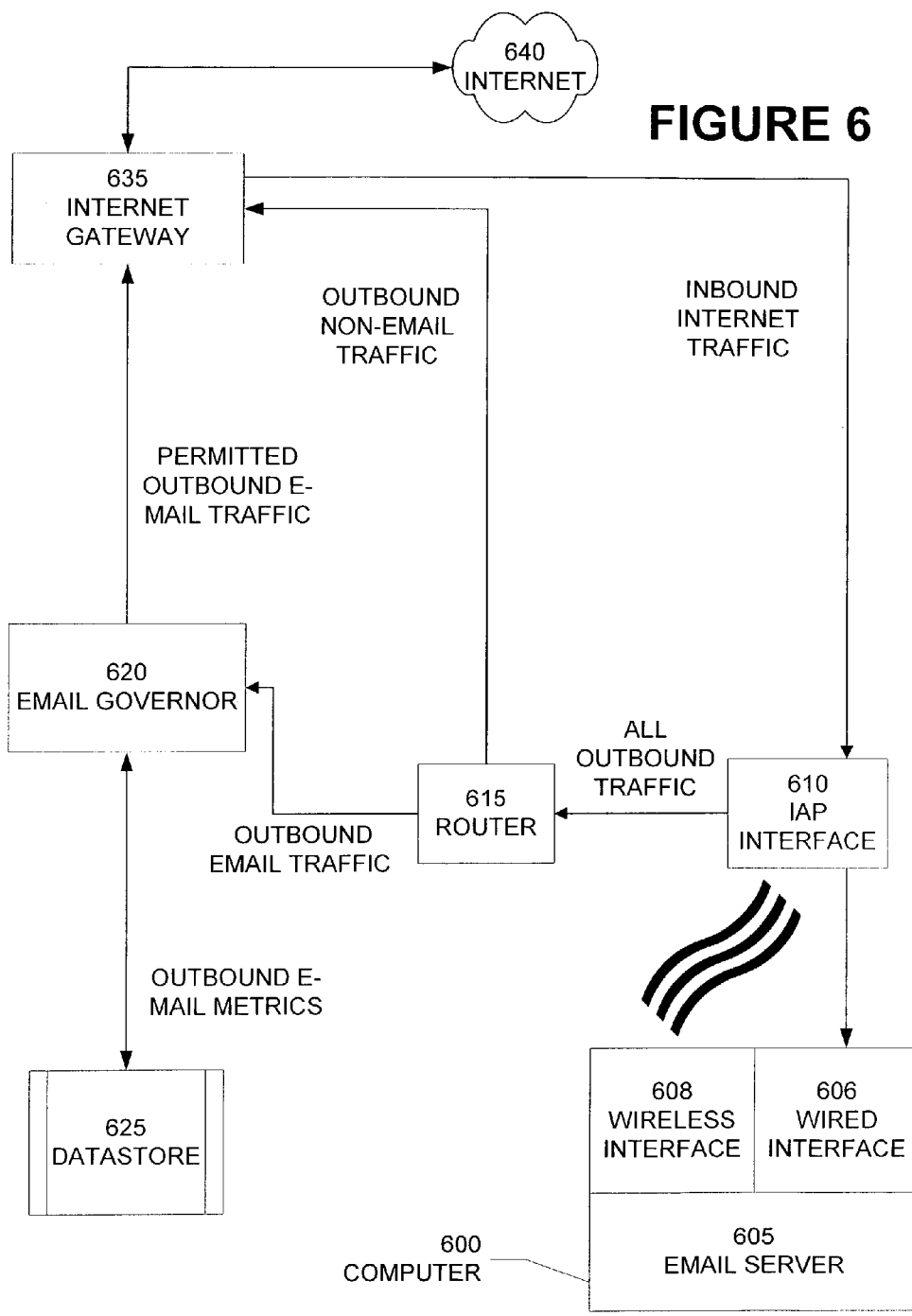
FIG. 6 illustrates an e-mail governor in an IAP network according to an embodiment of the present invention wherein a computer connected to the IAP network comprises an e-mail server.

In an alternative embodiment, an IAP does not operate an e-mail server. Rather, the e-mail server resides on the computer connected to the IAP's shared network. Referring to FIG. 6, a computer 600 comprising an e-mail server 605 is connected to IAP interface 610 through a wired interface 606. As illustrated, computer 600 may also connect to IAP interface 610 through wireless interface 608. The connection between computer 600 and ISP interface 610 can be accomplished through means well known in the art. For example, the connection through wired interface 606 may be made over the public switched network, over a wideband cable system, or over a DSL connection. The connection over wireless interface 608 may be made through an 802.11x-compliant transmitter/receiver attached or built into computer 600, or using wireless devices complaint with other wireless communication standards such as BlueTooth. As will be apparent to those skilled in the art, any means for connecting the computer 600 and IAP interface 610 may be used without departing from the scope of the present invention.

All outbound traffic (traffic from the computer toward the IAP) is directed from the IAP interface 610 to router 615. Router 615 identifies outbound e-mail messages through means well known in the art and directs outbound e-mail messages to e-mail governor 620. Outbound traffic other than outbound e-mail messages are directed to the Internet gateway 635. The e-mail governor 620 parses the outbound e-mail message and obtains from the IP packet header the IP address of the computer from which the outbound e-mail message originated.

Datastore 625 receives the origination IP address and other e-mail metrics. As will be described below, the IP address and the e-mail metrics are used to compute an e-mail message rate and/or an e-mail byte rate for the origination IP address. The e-mail message rate is used to determine if whether e-mail sent from the origination IP address is spam. The e-mail byte rate is used to determine if the origination IP address is using excess network resources to send e-mail.

Outbound e-mail messages that are determined by the e-mail governor 620 not to be "spam" are sent onto the Internet 640 through Internet gateway 635.

In an embodiment of the present invention, computer 600 is a laptop computer and wireless interface 608 is an 802.11x-compliant device, either integrated into computer 600 or connected to computer 600 by known means. By way of example and not as a limitation, transceiver 608 is connected to computer 600 via a USB port.

The process by which an e-mail message originating from the e-mail server 605 is determined to be spam or a legitimate e-mail is the same at that describe in the context of FIG. 2 and FIG. 3. The process by which the network resources utilized by computer 600 are measured is the same as described in the context of FIG. 4 and FIG. 5.

A system and method for monitoring and managing e-mail message traffic has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

We claim:

1. A method for blocking excess outbound e-mail traffic originating from an e-mail creation device connected to a shared access network comprising:
   creating an outbound e-mail message using an e-mail client operated by the e-mail creation device, wherein the outbound e-mail message comprises packets;
   proffering the outbound e-mail message from the e-mail creation device to an e-mail server via a shared access network;
   intercepting the proffered outbound e-mail message at an e-mail governor prior to receipt of the proffered e-mail by the e-mail server;
   obtaining at the e-mail governor the IP address of the e-mail creation device (the "originating IP address") from a packet;
   determining at the e-mail governor if the originating IP address matches a stored IP address stored in a stored IP address record;
   if the originating IP address matches the stored IP address, calculating at the e-mail governor a message transmission rate for the originating IP address and comparing the message transmission rate to a threshold message transmission rate;
   if the message transmission rate is less than or equal to the threshold message transmission rate, then sending the proffered outbound e-mail message to the e-mail server;
   if the message transmission rate exceeds the threshold message transmission rate, then discarding the outbound e-mail message and blocking subsequent e-mails from the originating IP address.

2. The method for blocking excess outbound email traffic originating from an e-mail creation device connected to a shared access network as in claim 1, wherein the e-mail creation device is a computer.

3. The method for blocking excess outbound email traffic originating from an e-mail creation device connected to a shared access network as in claim 2, wherein the computer is selected from the group consisting of a personal computer, a laptop computer, and a personal digital assistant.

4. The method for blocking excess outbound email traffic originating from an e-mail creation device connected to a shared access network as in claim 1, wherein the e-mail creation device is connected to the shared access network via a wired connection.

5. The method for blocking excess outbound email traffic originating from an e-mail creation device connected to a shared access network as in claim 1, wherein the e-mail creation device is connected to the shared access network via a wireless connection.

6. The method for blocking excess outbound email traffic originating from an e-mail creation device connected to a shared access network as in claim 1 further comprising:
   if the originating IP address does not match the stored IP address, creating a new stored IP address record associated with the IP address of the e-mail creation device, wherein the new stored IP address record comprises the originating IP address of the e-mail creation device, a time when the new stored IP address record was created and a message count of 1.

7. The method for blocking excess outbound email traffic originating from an e-mail creation device connected to a shared access network as in claim 1, wherein the stored IP address record further comprises:
    a message count; and
    a time when the stored IP address record was created; and
wherein calculating a message transmission rate for the originating IP address of the proffered outbound e-mail comprises:
    timestamping the proffered outbound e-mail message;
    incrementing the message count by 1; and
    calculating a message transmission rate by dividing the message count by the difference between the proffered outbound e-mail timestamp and the time the IP address record was created.

8. The method for blocking excess outbound email traffic originating from an e-mail creation device connected to a shared access network as in claim 1, wherein the stored IP record further comprises a message count, wherein the method further comprises establishing a time interval; and wherein calculating a message transmission rate for the originating IP address of the proffered outbound e-mail comprises:
    incrementing the message count by 1;
    making a determination whether the time interval has been reached; and
    if the time interval has been reached, setting the message transmission rate equal to the message count and setting the message count to zero.

9. The method for blocking excess outbound email traffic originating from an e-mail creation device connected to a shared access network as in claim 8 further comprising:
    if the originating IP address does not match the stored IP address, creating a new stored IP address record associated with the IP address of the e-mail creation device, wherein the new stored IP address record comprises the originating IP address of the e-mail creation device and a message count of 1.

10. A method for blocking e-mails from a consumer of excess network resources comprising:
    creating an outbound e-mail message using an e-mail client operated by the e-mail creation device, wherein the outbound e-mail message comprises packets;
    proffering the outbound e-mail message from the e-mail creation device to an e-mail server via a shared access network;
    intercepting the proffered outbound e-mail message at an e-mail governor prior to receipt of the proffered e-mail by the e-mail server;
    obtaining at the e-mail governor the IP address of the e-mail creation device (the "originating IP address") from a packet;
    determining at the e-mail governor if the originating IP address matches a stored IP address in a stored IP address record;
    if the originating IP address matches the stored IP address, calculating at the e-mail governor a message byte rate for the originating IP address and comparing the message byte rate to a threshold message byte rate;
    if the message byte rate is less than or equal to the threshold message byte rate, then sending the proffered outbound e-mail message to the e-mail server; and
    if the message byte rate exceeds the threshold message byte rate, then discarding the outbound e-mail message and blocking subsequent e-mails from the originating IP address.

11. The method for blocking e-mails from a consumer of excess network resources as in claim 10, wherein the e-mail creation device is a computer.

12. The method for blocking e-mails from a consumer of excess network resources as in claim 11, wherein the computer is selected from the group consisting of a personal computer, a laptop computer, and a personal digital assistant.

13. The method for blocking e-mails from a consumer of excess network resources as in claim 10, wherein the e-mail creation device is connected to the shared access network via a wired connection.

14. The method for blocking e-mails from a consumer of excess network resources as in claim 10, wherein the e-mail creation device is connected to the shared access network via a wireless connection.

15. The method for blocking e-mails from a consumer of excess network resources as in claim 10 further comprising:
    if the originating IP address does not match the stored IP address, creating a new stored IP address record associated with the IP address of the e-mail creation device, wherein the new stored IP address record of the e-mail creation device comprises the originating IP address of the e-mail creation device, a time when the new stored IP address record was created and a cumulative e-mail message byte total equal to the size in bytes of the proffered outbound e-mail message.

16. The method for blocking e-mails from a consumer of excess network resources as in claim 10, wherein the stored IP address record further comprises:
    a cumulative e-mail message byte total; and
    a time when the stored IP address record was created; and
wherein calculating a message byte rate for the originating IP address comprises:
    timestamping the proffered outbound e-mail message;
    adding the proffered outbound e-mail message size in bytes to the cumulative e-mail message byte total; and
    calculating the message byte rate by dividing the cumulative e-mail message byte total by the difference between the proffered outbound e-mail timestamp and the time the stored IP address record was created.

17. The method for blocking e-mails from a consumer of excess network resources as in claim 10, wherein the stored IP address record further comprises a cumulative message byte total, wherein the method further comprises establishing a time interval; and
    wherein calculating a message byte rate for the originating IP address of the proffered outbound e-mail comprises:
        adding the proffered outbound e-mail message size in bytes to the cumulative message byte total;
        making a determination whether the time interval has been reached; and
        if the time interval has been reached, setting the message byte rate equal to the cumulative message byte total and setting the cumulative message byte total to zero.

18. The method for blocking e-mails from a consumer of excess network resources as in claim 17 further comprising:
    if the originating IP address does not match the stored IP address, creating a new stored IP record associated with the IP address of the e-mail creation device, wherein the new stored IP address record comprises a cumulative e-mail message byte total equal to the size of the proffered outbound e-mail message in bytes.

19. A system for blocking origination of excess outbound e-mail traffic from an e-mail creation device comprising:
    a shared access network;
    an e-mail server connected to the shared access network;
    an e-mail governor;

an e-mail creation device connected to a shared access network;
an e-mail client operated by the e-mail creation device, wherein the e-mail client comprises instructions for:
  creating an outbound e-mail message, wherein the outbound e-mail message comprises packets; and
  proffering the outbound e-mail message to the e-mail server via the shared access network;
a router connected to the shared access network, wherein the router comprises instructions for:
  receiving the proffered outbound e-mail message from the e-mail creation device; and
  routing the proffered outbound e-mail message to the e-mail governor, wherein the e-mail governor comprises:
an IP address record, wherein the IP address record comprises:
  a time when the IP address record was created;
  a stored IP address; and
  a message count; and
instructions for:
  receiving the proffered outbound e-mail message;
  obtaining the IP address of the e-mail creation device from which the proffered outbound e-mail message originated (the "originating IP address") from a packet;
  determining if the originating IP address matches the stored IP address in the IP address record;
  if the originating IP address does not match the stored IP address then:
    creating an IP record associated with the IP address of the e-mail creation device;
    storing the time the IP address record was created in the IP address record; and
    setting the message count in the IP address record to 1;
  if the originating IP address matches the stored IP address then:
    timestamping the proffered outbound e-mail message;
    incrementing the message count by one;
    calculating a message transmission rate by dividing the message count by the difference between the proffered outbound e-mail timestamp and the time the IP record was created;
    comparing the message transmission rate to a threshold message transmission rate;
    if the message transmission rate is less than or equal to the threshold message transmission rate, then sending the proffered outbound e-mail message to the e-mail server; and
    if the message transmission rate exceeds a threshold message transmission rate, then discarding the outbound e-mail message and blocking subsequent e-mails from the originating IP address.

20. The system of claim 19, wherein the e-mail creation device is a computer.

21. The system of claim 20, wherein the computer is selected from the group consisting of a personal computer, a laptop computer, and a personal digital assistant.

22. The system of claim 19, wherein the e-mail creation device is connected to the shared access network via a wired connection.

23. The system of claim 19, wherein the e-mail creation device is connected to the shared access network via a wireless connection.

24. A system for blocking origination of excess outbound e-mail traffic from an e-mail creation device comprising:
a shared access network;
an e-mail server connected to the shared access network;
an e-mail governor;
an e-mail creation device connected to a shared access network;
an e-mail client operated by the e-mail creation device, wherein the e-mail client comprises instructions for:
  creating an outbound e-mail message, wherein the outbound e-mail message comprises packets; and
  proffering the outbound e-mail message to the e-mail server via the shared access network;
a router connected to the shared access network, wherein the router comprises instructions for:
  receiving the proffered outbound e-mail message from the e-mail creation device; and
  routing the proffered outbound e-mail message to the e-mail governor,
wherein the e-mail governor comprises:
  an IP address record, wherein the IP address record comprises:
    a stored IP address;
    a time interval; and
    a message count; and
  instructions for:
    measuring a time interval;
    receiving the proffered outbound e-mail message;
    obtaining the IP address of the e-mail creation device from which the proffered outbound e-mail message originated (the "originating IP address") from a packet;
    determining if the originating IP address matches the stored IP address in the IP address record;
    if the originating IP address does not match the stored IP address then:
      creating an IP record associated with the IP address of the e-mail creation device;
      setting the message count in the IP address record to 1;
    if the originating IP address matches the stored IP address then:
      incrementing the message count by one,
      determining if the lapsed time equals or exceeds the time interval;
      if the elapsed time is equal to or greater than the time interval, then setting the message transmission rate equal to the message count and setting the elapsed time and the message count to zero;
      comparing the message transmission rate to a threshold message transmission rate;
      if the message transmission rate is less than or equal to the threshold message transmission rate, then sending the proffered outbound e-mail message to the e-mail server; and
      if the message transmission rate exceeds a threshold message transmission rate, then discarding the outbound e-mail message and blocking subsequent e-mails from the originating IP address.

25. The system of claim 24, wherein the e-mail creation device is a computer.

26. The system of claim 25, wherein the computer is selected from the group consisting of a personal computer, a laptop computer, and a personal digital assistant.

27. The system of claim 24, wherein the e-mail creation device is connected to the shared access network via a wired connection.

28. The system of claim 24, wherein the e-mail creation device is connected to the shared access network via a wireless connection.

29. A system for blocking e-mails from a consumer of excess network resources comprising:
- a shared access network;
- an e-mail server connected to the shared access network;
- an e-mail governor;
- an e-mail creation device connected to a shared access network;
- an e-mail client operated by the e-mail creation device, wherein the e-mail client comprises instructions for:
  - creating an outbound e-mail message, wherein the outbound e-mail message comprises packets; and
  - proffering the outbound e-mail message to the e-mail server via the shared access network;
- a router connected to the shared access network, wherein the routed comprises instructions for:
  - receiving the proffered outbound e-mail message from the e-mail creation device; and
  - routing the proffered outbound e-mail message to the e-mail governor,
- wherein the e-mail governor comprises:
  - an IP address record, wherein the IP address record comprises:
    - a time when the IP address record was created;
    - a stored IP address; and
    - a cumulative message byte total; and
  - instructions for:
    - receiving the proffered outbound e-mail message, wherein the e-mail message comprises packets;
    - obtaining the IP address of an e-mail creation device connected to the shared access network from which the proffered outbound e-mail message originated (the "originating IP address") from a packet;
    - determining if the originating IP address matches the stored IP address in the IP address record; if the originating IP address does not match the stored IP address then:
      - creating an IP record associated with the IP address of the e-mail creation device;
      - storing the time the IP address record was created in the IP address record; and
      - setting the cumulative message byte total in the IP address record to the size of the proffered outbound e-mail message in bytes;
    - if the originating IP address matches the stored IP address then:
      - timestamping the proffered outbound e-mail message,
      - adding the size of the proffered outbound e-mail message in bytes to the cumulative message byte total;
      - calculating a message byte rate by dividing the cumulative message byte total by the difference between the proffered outbound e-mail timestamp and the time the IP address record was created;
      - comparing the message byte rate to a threshold message byte rate;
      - if the message byte rate is less than or equal to the threshold message byte rate, then sending the proffered outbound e-mail message to the e-mail server; and
      - if the message byte rate exceeds a threshold message byte rate, then discarding the outbound e-mail message and blocking subsequent e-mails from the originating IP address.

30. The system of claim 29, wherein the e-mail creation device is a computer.

31. The system of claim 30, wherein the computer is selected from the group consisting of a personal computer, a laptop computer, and a personal digital assistant.

32. The system of claim 29, wherein the e-mail creation device is connected to the shared access network via a wired connection.

33. The system of claim 29, wherein the e-mail creation device is connected to the shared access network via a wireless connection.

34. A system for blocking emails from a consumer of excess network resources comprising:
- a shared access network;
- an e-mail server connected to the shared access network;
- an e-mail governor;
- an e-mail creation device connected to a shared access network;
- an e-mail client operated by the e-mail creation device, wherein the e-mail client comprises instructions for:
  - creating an outbound e-mail message, wherein the outbound e-mail message comprises packets; and
  - proffering the outbound e-mail message to the e-mail server via the shared access network;
- a router connected to the shared access network, wherein the router comprises instructions for:
  - receiving the proffered outbound e-mail message from the e-mail creation device; and
  - routing the proffered outbound e-mail message to the e-mail governor,
- wherein the e-mail governor comprises:
  - an IP address record, wherein the IP address record comprises:
    - a time interval;
    - a stored IP address; and
    - a cumulative message byte total; and
  - instructions for:
    - measuring the time interval;
    - receiving the proffered outbound e-mail message, wherein the e-mail message comprises packets;
    - obtaining the IP address of an e-mail creation device connected to the shared access network from which the proffered outbound e-mail message originated (the "originating IP address") from a packet;
    - determining if the originating IP address matches the stored IP address in the IP address record;
    - if the originating IP address does not match the stored IP address:
      - creating an IP record associated with the IP address of the e-mail creation device; and
      - setting the cumulative message byte total in the IP address record to the size of the proffered outbound e-mail message in bytes;
    - if the originating IP address matches the stored IP address then:
      - determining if the lapsed time equals or exceeds the time interval;
      - if the elapsed time is equal to or greater than the time interval, then setting the message byte rate equal to the cumulative message byte total and set the elapsed time and the cumulative message byte total to zero;
      - comparing the message byte rate to a threshold message byte rate;

if the message byte rate is less than or equal to the threshold message byte rate, then sending the proffered outbound e-mail message to the e-mail server; and if the message byte rate exceeds a threshold message transmission rate, then discarding the outbound e-mail message and blocking subsequent e-mails from the originating IP address.

35. The system for detecting a consumer of excess network resources as in claim 34, wherein the e-mail creation device is a computer.

36. The system of claim 35, wherein the computer is selected from the group consisting of a personal computer, a laptop computer, and a personal digital assistant.

37. The system of claim 35, wherein the e-mail creation device is connected to the shared access network via a wired connection.

38. The system of claim 34, wherein the e-mail creation device is connected to the shared access network via a wireless connection.

* * * * *